United States Patent Office 3,657,352

Patented Apr. 18, 1972

3,657,352

PROCESS FOR THE PREPARATION OF TERTIARY PHOSPHINE OXIDES

Hans-Jerg Kleiner, Bad Soden, Taunus, Germany, assignor to Farbwerke Hoechst Aktiengesellschaft vormals Meister Lucius & Bruning, Frankfurt am Main, Germany

No Drawing. Filed Mar. 4, 1970, Ser. No. 16,612

Int. Cl. C07f *9/50*

U.S. Cl. 260—606.5 P 7 Claims

ABSTRACT OF THE DISCLOSURE

Improved process for the preparation of tertiary phosphine oxides by reacting dialkyl phosphine oxides with α-olefins wherein the reaction is carried out under an atmosphere of an inert gas with exposure to ultraviolet light, in the presence of catalytical amounts of free radical-forming agents or in the absence of these catalytical measures at a temperature between 130° and 200° C.

In comparison to known processes the tertiary phosphine oxides are obtained within a shorter reaction time, with higher purity and in higher yields. The reaction products can be used as intermediates, surfactants, detergents and cleaning agents, especially in cosmetic products.

The present invention relates to a process for the preparation of tertiary phosphine oxides.

It is known that secondary dialkyl phosphine oxides having higher alkyl groups or substituted alkyl groups can be added on olefins containing a non-activated carbon-carbon double bond in the presence of free radical-forming substances to yield tertiary phosphine oxides (cf. Houben-Weyl "Methoden der Organischen Chemie," XII/1 (1963), page 153). For example, U.S. Pat. No. 2,957,931 discloses the reaction of dioctyl phosphine oxide with octene-1 in xylene as a solvent at 130–140° C. in the presence of almost molar amounts of di-tertiary-butyl peroxide, calculated on dioctyl phosphine oxide used. After a reaction period of 19 hours a mixture of trioctylphosphine oxide and dioctyl-hexadecyl phosphine oxide is obtained. According to J. Org. Chem. 25, page 4628 (1961), the reaction of bis - (2 - cyanoethyl) - phosphine oxide with octene-(1) in methanol in the presence of 18 mol-percent of azo-bisisobutyronitrile as a catalyst provides bis - (2 - cyanoethyl) - octyl - phosphine oxide in a yield of 48%. Finally, H. R. Hays (cf. J. Org. Chem. 33, page 3690 (1968)) succeeded in adding dimethyl phosphine oxide on dodecene-(1) at 70° C. during a reaction time of 24 hours. For this purpose, he used dodecene-(1) in a large excess and azo-bisisobutyronitrile in an amount of 10 mol-percent as the catalyst. Dimethyldodecyl phosphine oxide was obtained in a yield of 76%, calculated on dimethyl phosphine oxide used.

It has now been found that tertiary phosphine oxides of the general formula

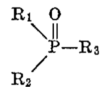

(I)

in which $R_1$ and $R_2$ each represents a methyl or ethyl group and $R_3$ stands for an alkyl group, are obtained in good yield within a shorter reaction time and with higher purity than according to the known process, by reacting dialkyl phosphine oxides of the general formula $$\begin{array}{l} R_1\ \ O \\ \quad\diagdown\,\| \\ \qquad P-H \\ \quad\diagup \\ R_2 \end{array} \qquad (II)$$

in which $R_1$ and $R_2$ have the meanings given above, with α-olefins under an atmosphere of an inert gas with exposure to ultraviolet light, in the presence of catalytical amounts or free radical-forming agents or in the absence of said catalytical measures at a temperature of from 130° to 200° C.

It is surprising that the reaction according to the invention can also be carried out at high temperatures of from 130° to 200° C. and thereby yields tertiary phosphine oxides of the Formula I with a high purity. For it is known that secondary alkyl phosphine oxides which have a decreasing number of carbon atoms in the alkyl radicals have an increasing tendency to disproportionate into secondary phosphines and phosphinic acids upon heating in an intermolecular redox reaction (cf. Houben-Weyl, "Methoden der Organischen Chemie," XII, 1 (1963), pages 64 and 193; Am. Soc. 77, (1955), page 3412). These findings have also been confirmed by investigations recently carried out by H. R. Hays, J. Org. Chem., 33, page 3690 (1968). Hays demonstrated that this tendency to disproportionate exists in the case of dimethyl phosphine oxide used by him. This substance decomposes at 120° C. within about 1 hour, at 160° to 170° C. within less than 10 minutes.

Therefore, it would have been expected that the high temperatures applied in the process of the invention give rise to a disproportioning of the phosphine oxides rather than to an addition of the lower dialkyl phosphine oxides on the olefins. It should especially be noted that, according to the invention, disproportioning does not take place even if operating in the presence of free radical-forming agents, such as peroxides, or with exposure to ultraviolet light. It is, furthermore, very surprising that, in contrast to the teaching of the above-cited literature (Houben-Weyl [loc. cit.], page 153, and U.S. Pat. No. 2,957,931), the addition of dimethyl- and diethyl phosphine oxides on olefins can also be effected with good results in the absence of free radical-forming agents.

The dialkyl phosphine oxides used as starting material according to the invention may be prepared according to the process disclosed in Belgian Pat. No. 737,594. The reaction according to the present invention proceeds especially smoothly and provides very high yields when the dialkyl phosphine oxides are used in a very pure form such as obtained according to the above process.

The α-olefins used for the reaction may contain from about 6 to 22 carbon atoms. The α-monolefins used for the present process may not only be linear but also branched, for example hexene-(1), heptene-(1), octene-(1), dodecene-(1), tridecene-(1), tetradecene-(1), pentadecene-(1), hexadecene-(1), octadecene-(1), heneicosene-(1), decosene-(1), 2-methyl-pentene-(1), 4-methylpentene-(1), and 2-ethyl-hexene-(1), as well as mixtures of these olefins.

Especially favorable results are obtained if the α-monoolefin used is free, or almost free, from sulfur, which means a content of bound sulfur of less than about 0.002%.

According to the process of the invention, the olefins advantageously used are freed from sulfur already during the process of their preparation, for example by the so-called Ziegler or Mülheim process wherein ethylene is dimerized or oligomerized in the presence of catalysts, especially triethyl aluminum, to yield straight-chain α-olefins. The same process also permits the preparation of branched α-olefins, for example 2-methyl-pentene-(1) and 2-ethyl-hexene-(1), by dimerizing, for example propene or isobutylene (cf. F. Asinger "Chemie und Technologie der Monoolefine" (1957), especially pages 178–180). Dimerization can also be effected in a different way, for example catalytically in the presence of alkali metals. It is, of course, also possible to use α-olefins as starting material that have been obtained by other known methods, for example by cracking mineral oil fractions or waxes, by spliting off hydrogen chloride from paraffins having chlorine atoms in terminal positions, or by dehydrating terminal alcohols. Unless these olefins are free or practically free from sulfur, it is advantageous to eliminate the sulfur completely or almost completely by appropriate measures, for example by catalytic desulfuration.

The reaction is carried out at a temperaure of from about 130° C. to 200° C., preferably from about 140° C. to 170° C. As inert gases there are, above all, mentioned argon and nitrogen.

The reaction time according to the invention is substantially shorter than that of hitherto known methods; for example, for the preparation of 1 mol of tertiary phosphine oxide it ranges from about 1½ hours to about 4 hours, in most cases it is about 2 hours.

When the reaction is carried out at temperatures exceeding about 160° C. good yields are provided even without applying catalytical measures. To achieve a short reaction time and a good yield, it is suitable to add catalytical amounts of a free radical-forming agent or to use radiation with ultraviolet light. These catalytical measures may also be advisable if the starting products are not especially pure. The free radical-forming agents are used in catalytical amounts of up to about 2 mol-percent, preferably from 0.1 to 1 mol-percent, calculated on the amount of tertiary phosphine oxide to be obtained in theory. They are suitably dissolved in the reaction component which is slowly added in the course of the reaction. In case a free radical-forming agent is only soluble in the secondary phosphine oxide, part of the total amount of dialkyl phosphine oxide in which this free radical-forming agent is dissolved can be added dropwise separately, in addition to the olefin added during the reaction.

As free radical-forming agents there are mentioned, for example: di-tertiary butyl peroxide, tertiary butyl-peroxy benzoate, 2,5 - dimethylhexane-bis-2,5-(peroxy-benzoate), tertiary butyl-hydroperoxide, dicumyl peroxide and azobisisobutanol diacetate. The appropriate free radical-forming agent is selected with regard to the reaction temperature chosen. Within this temperature range the free radical-forming agent must have a sufficiently long half-life of decomposition. A preferable free radical-forming agent is ditertiary butyl peroxide.

Dialkyl phosphine oxide and olefin are suitably used at a molar ratio of about 1:1, but it is also possible to use one reaction component in an excess, for example up to 4 times the molar amount.

The reaction may also be carried out in the presence of inert solvents, for example alcohols, esters and hydrocarbons; it is, however, preferable not to use any solvent.

According to the reaction of the invention, the olefin is added dropwise to the dialkyl phosphine oxide, optionally in admixture with catalytical amounts of a free radical-forming agent. Low-boiling olefins are advantageously added in such a manner that the outlet pipe of the dropping funnel is placed beneath the surface of the dialkyl phosphine oxide. It is also possible to put tertiary phosphine oxide prepared in a first batch into the reaction vessel as dissolving mediator and simultaneously add the reaction components dropwise, optionally in admixture with catalytical amounts of a free radical-forming agent. This working method may be suitable for a continuous operation of the process. The reaction mixture obtained thereby is then withdrawn at the same rate as olefin and secondary phosphine oxide are introduced into the reactor. This mixture may subsequently be kept at a determined temperature in another reaction vessel to complete the reaction, and the product obtained is the crude tertiary phosphine oxide.

The purity of the tertiary phosphine oxides prepared according to the invention is especially high, thus providing them with a special advantage in many application fields.

The tertiary phosphine oxides obtainable by the process of the present invention are valuable intermediates; especially interesting are tertiary phosphine oxides which contain a long-chained alkyl group and can be prepared by reaction with olefins having at least 8 carbon atoms, owing to their surfactive and bacteriostatic properties. They may be used in detergents and cleaning agents, especially in cosmetic products.

The following examples serve to illustrate the invention.

EXAMPLE 1

Into a four-necked flask provided with stirrer, reflux condenser, gas inlet pipe and dropping funnel, 100 g. of dimethyl phosphine oxide were introduced and, by means of the gas inlet pipe that was not immersed, nitrogen washed with concentrated sulfuric acid was passed through the apparatus first in a rapid current for 30 minutes, and then at a reduced rate. The dimethyl phosphine oxide was heated to 145° C.; while carefully stirring 326 g. of octadecene-(1) mixed with 0.3 g. of di-tertiary butyl peroxide were added dropwise within 2 hours and 40 minutes. Stirring was then continued for 5 minutes at 160° C., the nitrogen supply was cut and the reaction mixture was subjected to distillation under a reduced pressure of 0.15 mm. mercury and at temperatures of from 75 to 140° C. The residue consisted of 400 g. of practically pure octadecyl-dimethyl phosphine oxide, M.P. 88–90° C., which corresponded to a theoretical yield of 94%.

EXAMPLE 2

Into the apparatus described in Example 1, 103 g. of dimethyl phosphine oxide were introduced and, after evacuation of air by means of nitrogen, 148 g. of octene-(1) mixed with 1.5 g. of di-tertiary butyl peroxide were added dropwise, while carefully stirring, at 140–150° C. for 1 hour and 40 minutes, and while continuously feeding in nitrogen. Stirring was then continued for 30 minutes at 160° C. and the nitrogen supply was cut. The reaction mixture was subsequently subjected to distillation under reduced pressure. After a first running, 242 g. of octyl-dimethyl phosphine oxide, boiling point: 118° C., under a pressure of 0.1 mm. mercury, M.P. 60–62° C., were obtained which corresponded to a theoretical yield of 96.5%.

EXAMPLE 3

A mixture of 231 g. of dodecyl-dimethyl phosphine oxide, 180 g. of dimethyl phosphine oxide and 50 g. of dodecene-(1) was introduced into a flask provided with gas inlet pipe, dropping funnel, reflux condenser, stirrer and ultraviolet immersion lamp. Air was evacuated therefrom by means of a vigorous nitrogen current and then 190 g. of dodecene-(1) were added dropwise within 90 minutes at 140–150° C. while exposing the mixture to ultraviolet light. During the reaction the mixture had to be cooled in order to keep the temperature within a range of from 140 to 150° C. Stirring was continued for 30 minutes at this temperature and then the reaction mixture was subjected to distillation under a pressure of 0.2 mm. mercury. 64 g. of unreacted dimethyl phosphine oxide and 3 g.

of dodecene-(1) as well as 579 g. of dodecyl-dimethyl phosphine oxide were obtained, which corresponded to a theoretical yield of 99%, calculated on the dodecene-(1) used. The recovered dimethyl phosphine oxide was very pure and could be directly used again.

EXAMPLE 4

Into the apparatus described in Example 1, 140 g. of dimethyl phosphine oxide were introduced and air was evacuated by means of a vigorous nitrogen current. While continuing the supply of nitrogen and carefully stirring, a mixture of 400 g. of hexadecene-(1) and 3 g. of azo-bisisobutanol diacetate was added dropwise within 2 hours at 140–150° C. The reaction mixture was then subjected to distillation under a pressure of 0.2 mm. mercury—up to an internal temperature of 185° C. without using a column. The flask contained as a residue 515 g. of practically pure hexadecyl-dimethyl phosphine oxide, M.P. 83–85° C., which corresponded to a theoretical yield of 95%.

EXAMPLE 5

In the apparatus described in Example 1, from which air had been evacuated by means of nitrogen, a mixture of 170 g. of dodecene-(1) and 1 g. of di-tertiary butyl peroxide was added dropwise to 106 g. of diethyl phosphine oxide while continuously feeding in nitrogen and carefully stirring at 170° C. within 2 hours. Stirring was continued for another hour at this temperature, the nitrogen supply was cut and the reaction mixture was subjected to distillation at reduced pressure. After a first running, 262.5 g. of dodecyl-diethyl phosphine oxide, M.P. 46–48° C., were obtained which corresponded to a theoretical yield of 96%.

EXAMPLE 6

Into the apparatus described in Example 1, 100 g. of diethyl phosphine oxide were introduced and air was evacuated by means of a vigorous nitrogen current. Subsequently, while continuing the feed of nitrogen and carefully stirring, a mixture of 80 g. of hexene-(1) and 2 g. of azo-bisisobutanol diacetate was added dropwise within 2 hours at 140–150° C. The reaction mixture was subjected to distillation at reduced pressure. After a first running, 170 g. of hexadiethyl phosphine oxide, boiling point 136–136.5° C. under a pressure of 0.5 mm. mercury, were obtained which corresponded to a theoretical yield of 95%.

EXAMPLE 7

In the apparatus described in Example 1, a mixture of 168 g. of dodecene-(1) and 1.2 g. of di-tertiary butyl peroxide was added dropwise to 78 g. of dimethyl phosphine oxide, while stirring carefully at 150° C. within 90 minutes under an atmosphere of nitrogen. Stirring was then continued for 10 minutes at this temperature, the nitrogen supply was cut and the reaction product was subjected to distillation under a pressure of 0.2 mm. mercury. After a first running, 230 g. of dodecyldimethyl phosphine oxide corresponding to a theoretical yield of 93.5% were obtained.

EXAMPLE 8

In the apparatus described in Example 1, from which air had been evacuated by means of nitrogen, 172 g. of dodecene-(1) were added dropwise to 80 g. of dimethyl phosphine oxide within 90 minutes at 165–170° C., while carefully stirring and continuously feeding in nitrogen. The mixture was stirred for another hour at this temperature, the nitrogen supply was cut and the mixture was subjected to distillation under a pressure of 0.2 mm. mercury. After a first running, 206 g. of dodecyldimethyl phosphine oxide corresponding to a theoretical yield of 82% were obtained (M.P. 82–83° C.). Calculated on the dimethyl phosphine oxide reacted and considering the dimethyl phosphine oxide recovered with a high purity so that it could immediately be recycled to the reaction, the theoretical yield was 90%.

EXAMPLE 9

Through an apparatus as described in Example 1, which contained 334.5 g. of dimethyl phosphine oxide, nitrogen was passed in a vigorous current for 30 minutes. Subsequently, while continuing the feed of nitrogen and carefully stirring, a mixture of 6 g. of di-tertiary butyl peroxide and 360 g. of hexene-(1) was added dropwise within 4 hours at 140° C. Stirring was continued for another hour at this temperature. Then the nitrogen supply was cut and the reaction mixture was subjected to distillation under a pressure of 0.2 mm. mercury. After a first running, 625 g. of hexyl-dimethyl phosphine oxide, corresponding to a theoretical yield of 90%, were obtained. (Boiling point 115° C. under a pressure of 0.7 mm. mercury, solidification point: 46–46.5° C.).

EXAMPLE 10

150 g. of dimethyl phosphine oxide were introduced into a flask provided with gas inlet pipe, dropping funnel, reflux condenser and ultraviolet immersion lamp, and air was evacuated by means of a nitrogen current. With exposure to ultraviolet light 376 g. of tetradecene-(1) were added dropwise, while vigorously stirring, at 150–155° C. within 90 minutes. Stirring was continued for 30 minutes, and the reaction mixture was then subjected to distillation under a pressure of 0.2 mm. mercury. At a temperature of 184° C., 500 g. of tetradecyl-di-methyl phosphine oxide passed over, M.P. 82–84° C. This amount corresponded to a theoretical yield of 95%.

EXAMPLE 11

100 g. of dimethyl phosphine oxide were introduced into an apparatus as described in Example 1. After evacuation of air by means of nitrogen, a mixture of 364 g. of eicosene-(1) and 1.5 g. of di-tertairy butyl peroxide was added dropwise within 2 hours at 140–150° C., while carefully stirring and continuously feeding in nitrogen. Stirring was continued for 30 minutes at 150° C. and the reaction mixture was then heated to an internal temperature of 200° C. under a pressure of 0.2 mm. mercury Only 1 g. of the product separated by distillation at a temperature of 55° C. The reaction batch was then cooled and it solidified. 363 g. of eicosyl-dimethyl phosphine oxide were obtained and recrystallized from acetone, M.P. 102–104° C.

I claim:

1. In the process for the preparation of tertiary phosphine oxides of the formula

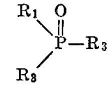

wherein $R_1$ and $R_2$ are methyl or ethyl and $R_3$ is alkyl, by reacting dialkyl phosphine oxides of the formula

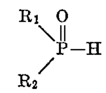

wherein $R_1$ and $R_2$ have the meanings given above, with α-olefins, the improvement which comprises reacting said tertairy phosphine oxides with said α-olefins under an atmosphere of an inert gas at a temperature between 130° C. and 200° C.

2. The process as claimed in claim 1, wherein the reaction is carried out under exposure to ultraviolet light.

3. The process as claimed in claim 1, wherein the reaction is carried out in the presence of catalytical amounts of free radical forming agents.

4. The process as claimed in claim 1, wherein the reaction is carried out in the presence of up to about 2 mol percent of a free radical forming agent, calculated on the amount of tertiary phosphine oxide to be obtained in theory.

5. The process as claimed in claim 1, wherein the reaction is carried out in the presence of 0.1 to 1 mol percent of a free radical forming agent, calculated on the amount of tertiary phosphine oxide to be obtained in theory.

6. The process as claimed in claim 1, wherein di-tert. butyl peroxide is used as free radical forming agent.

7. The process as claimed in claim 1, wherein the reaction is carried out with α-olefins containing 6 to 22 carbon atoms.

References Cited

UNITED STATES PATENTS 3,518,311 6/1970 Maier ---------- 260—606.5 P

JAMES E. POER, Primary Examiner

W. F. W. BELLAMY, Assistant Examiner

U.S. Cl. X.R.

204—158 R